United States Patent
Shaffer et al.

(10) Patent No.: US 6,411,990 B1
(45) Date of Patent: Jun. 25, 2002

(54) APPARATUS AND METHOD FOR DOWNLEVEL DATE FILE MESSAGING

(75) Inventors: Shmuel Shaffer, Palo Alto; William Joseph Beyda, Cupertino; Paul Bonomo, San Jose, all of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/235,570

(22) Filed: Jan. 22, 1999

(51) Int. Cl.[7] .............................................. G06F 13/00
(52) U.S. Cl. ........................ 709/206; 709/329; 707/203
(58) Field of Search ................................ 709/204, 206, 709/217, 219, 313, 328, 329; 707/104, 200, 203, 501

(56) References Cited

U.S. PATENT DOCUMENTS

| | | | | |
|---|---|---|---|---|
| 5,608,874 A | | 3/1997 | Ogawa et al. | ......... 395/200.15 |
| 5,740,405 A | * | 4/1998 | DeGraaf | ................. 395/500.43 |
| 5,818,447 A | * | 10/1998 | Wolf et al. | ................... 345/335 |
| 5,974,449 A | * | 10/1999 | Chang et al. | ................ 709/206 |
| 6,092,114 A | * | 7/2000 | Shaffer et al. | ............... 709/232 |
| 6,101,320 A | * | 8/2000 | Schuetze et al. | ........ 395/200.36 |

* cited by examiner

Primary Examiner—Viet D. Vu (57) ABSTRACT

A system and method for sending an electronic message in a compatible messaging format are presented. According to an embodiment of the present invention, a file, such as a data file, is automatically examined in the context of its application, and the lowest available file format level that preserves the data integrity is selected. An alternate version of this file, such as an unformatted text-only file, that preserves the content of the message may also be created and sent.

41 Claims, 6 Drawing Sheets

APPARATUS AND METHOD FOR DOWNLEVEL DATE FILE MESSAGING

BACKGROUND OF THE INVENTION

The present invention relates to electronic messaging systems. In particular, the present invention relates to electronic messaging formats.

Messaging systems are now an integral part of business communications as well as personal communications. Messaging systems may include voice messaging, data messaging, video messaging, fax, and image messaging. In addition to electronic mail (e-mail) and voice mail, today's electronic messaging systems may also include multimedia messages. A multimedia message is typically a message that includes more than one media. For example, a multimedia message may include text, video, audio, and images, such as graphs and charts. In a multimedia messaging system, the ability to exchange e-mails, voicemails, faxes, image and video may all be part of a basic multimedia system. Examples of multimedia messaging systems include ViewMail, Phone Max, Repartee, and View Call Plus, all by Active Voice.

Messaging systems, such as data messaging systems or a multimedia messaging system, often allow attachments to be sent with a message. With technology changing so quickly, it is often the case that one user is using a version of an application that is different from another user's application. Accordingly, it is fairly common for the sender to use a different version of an application associated with an attachment than the receiver is using. For example, a sender may attach a Microsoft Word 97 document in a message to a receiver. However, the receiver uses an older version of the Microsoft Word application, such as Microsoft Word 95.

The mis-match of application versions may be quite common since it is likely that not all sites of a multi-site company will migrate at the same time as the company migrates to a new version of an application. Typically, a newer version of an application may read and save a document produced by an older version of the application. However, the older version typically cannot access a document created by the newer version. Accordingly, a receiver of an attachment who uses an older version of an application may not be able to open the attachment that was produced by a newer version. When a user receives a message that is unreadable, typically the user manually needs to request the sender to re-send the message in a lower version of the application. Unfortunately, requesting a message re-send and then re-sending of the message in a lower version often wastes time and resources. Additionally, if the message is urgent, then the delay caused by the need to re-send the message may be detrimental.

It would be desirable to facilitate efficient communication between users who may be using a different version of the same application. The present invention addresses such a need.

SUMMARY OF THE INVENTION

A system and method for sending an electronic message in a compatible messaging format is presented. According to an embodiment of the present invention, a file, such as a data file, is automatically examined in the context of its application, and the lowest available file format level that preserves the data integrity is selected. An alternate version of this file, such as an unformatted text-only file, that preserves the content of the message may also be created and sent.

A method according to an embodiment of the present invention for sending an electronic message is presented. The method comprises determining an application used to create at least a portion of a first electronic message. The method also determines a version of the application that supports a feature associated with the first electronic message. A second electronic message is created, wherein the second electronic message is formatted in the determined version of the application. A third electronic message is also created, wherein the third electronic message is a predetermined version of the portion of the first electronic message.

A system according to an embodiment of the present invention for sending an electronic message is also presented. The system comprises a processor configured to determine an application used to create at least a portion of a first electronic message. The processor also determines a version of the application that supports a feature associated with the first electronic message. Further, the processor creates a second electronic message, wherein the second electronic message is formatted in the determined version of the application. The processor also creates a third electronic message, wherein the third electronic message is a predetermined version of the portion of the first electronic message. The system also includes a memory coupled to the processor, wherein the memory is configured to provide the processor with instructions.

According to another embodiment, the present invention provides a method for receiving an electronic message. The method includes receiving an electronic message, and determining whether a first version of an application may be used to open a second version of the application, wherein the second version of the application is associated with an attachment of the electronic message. The method also includes displaying the electronic message with a default version if the first version of the application. cannot be used to open the second version of the application.

DETAILED DESCRIPTION OF SPECIFIC EMBODIMENTS

Figure 1:
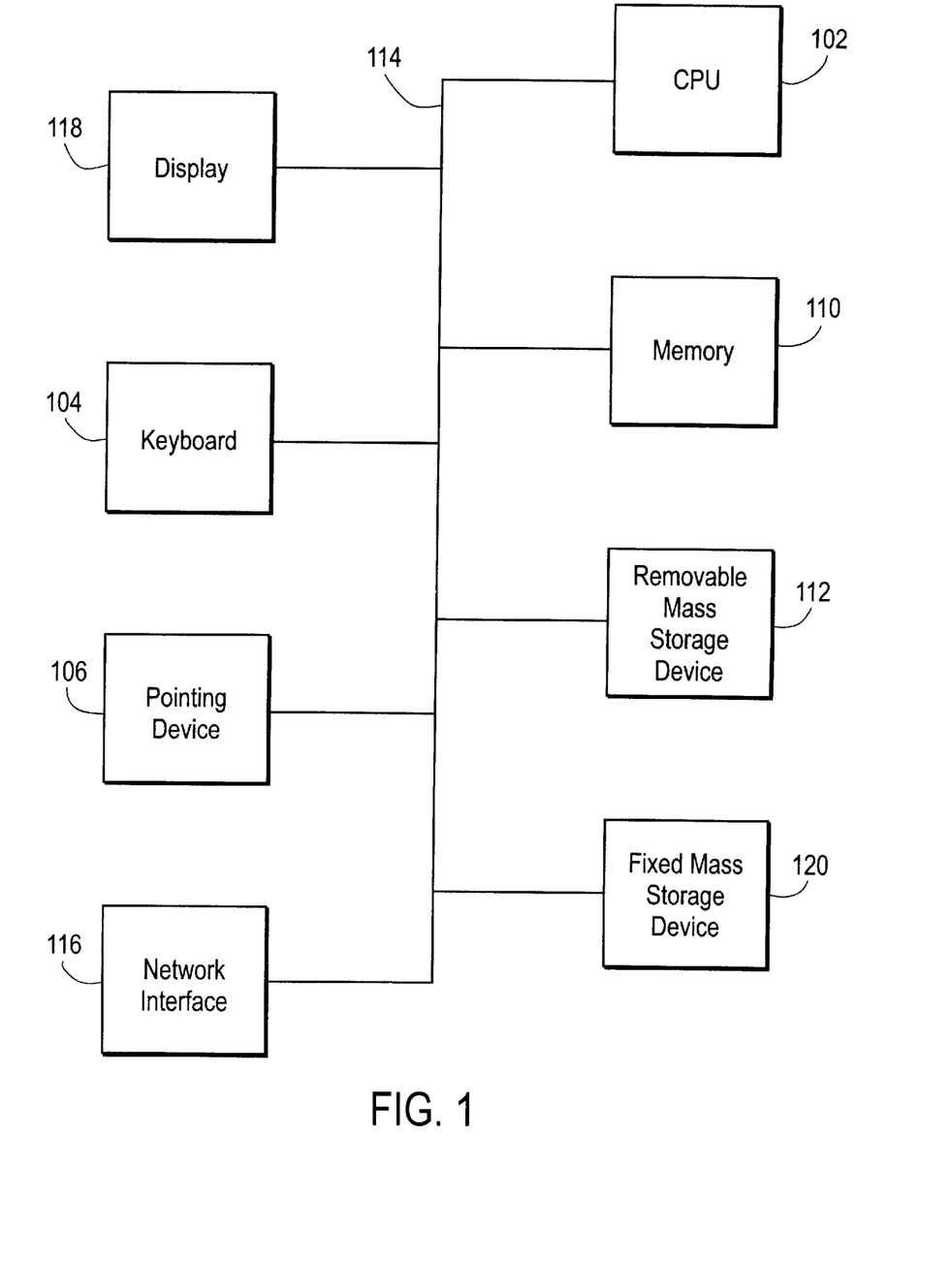
FIG. 1 is a block diagram of a computer system for implementing an embodiment of the present invention.

FIG. 1 is a block diagram of a computer system suitable for implementing an embodiment of the present invention. FIG. 1 illustrates one embodiment of a general-purpose computer system. Other computer system architectures and configurations can also be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general-purpose digital processor that controls the operation of the computer system 100. Using instructions retrieved from memory 110, the CPU 102 controls the reception and manipulation of input data, and the output and display of data on output devices.

CPU 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on CPU 102. Also as well known in the art, primary storage typically includes basic operating instructions, program code, data, and objects used by the CPU 102 to perform its functions. Primary storage devices 110 may include any suitable computer-readable storage media described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDs, portable mass storage devices, holographic storage devices, and other storage devices. A fixed mass storage 120 can also provide additional data storage capacity. The most common example of mass storage 120 is a hard disk drive. Mass storage 112 and 120 generally store additional programming instructions, data, and the like that typically are not in active use by the CPU 102. It will be appreciated that the information retained within mass storage 112 and 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer-readable medium that contain program code for performing various computer-implemented operations. The computer-readable medium is any data storage device that can store data, which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2:
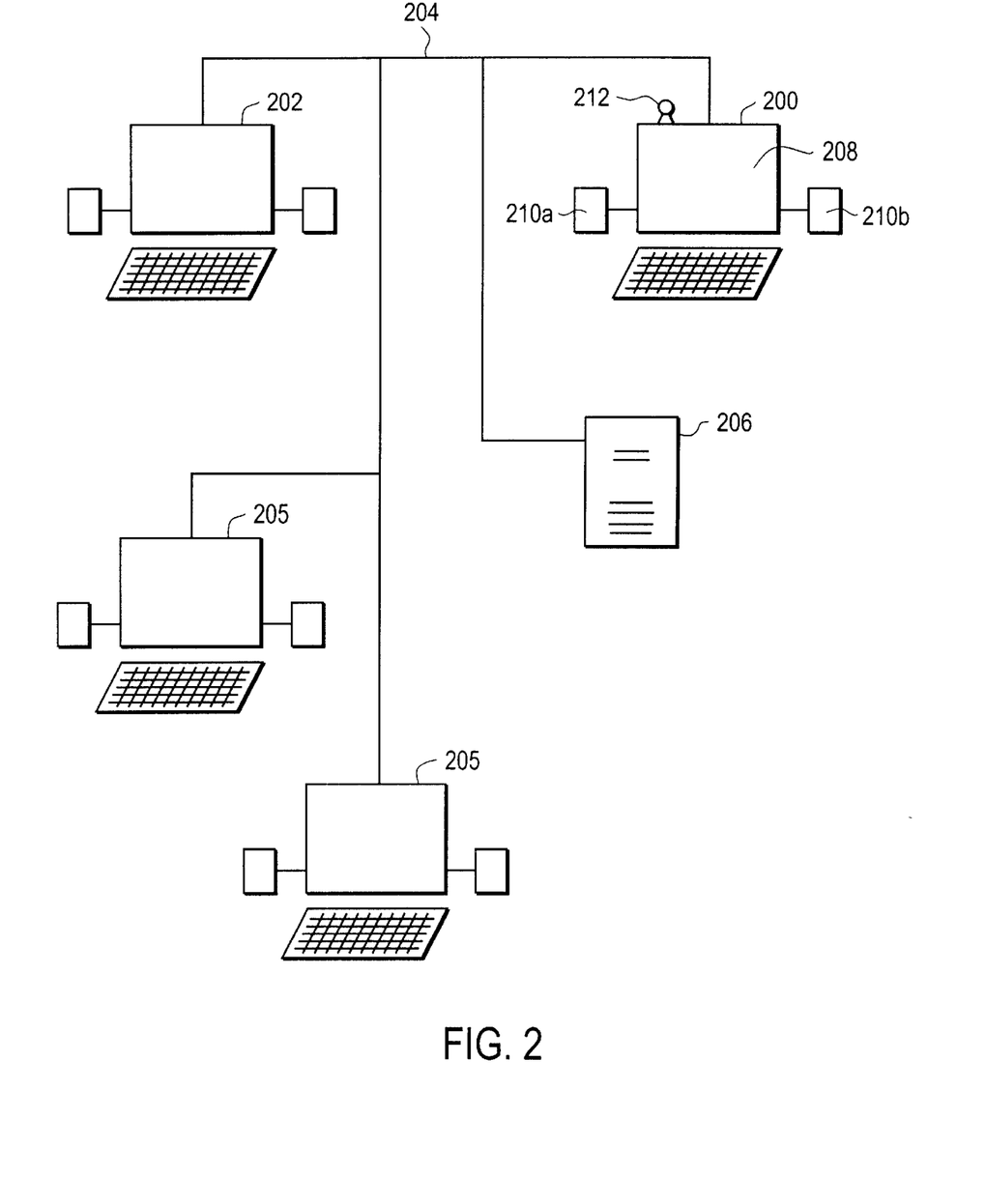
FIG. 2 is a block diagram of a network system suitable for implementing an embodiment of the present invention.

FIG. 2 is a block diagram of an example of a network system suitable for implementing an embodiment of the present invention. FIG. 2 is shown to include at least a sending computer 200 and a receiving computer 202 networked together. The software for the messaging system of the present invention may be server-based and/or client-based. Sending computer 200 and receiving computer 202 are networked together via network 204, which can also include other computers 205 and/or a server(s) 206 as shown. Examples of the network 204 include a cable network, a local area network (LAN), a wireless network, the Internet, and an Intranet. Of course, in other embodiments, sending computer 200 and receiving computer 202 may be connected point-to-point. Similar to other computers in the network 204, sending (computer 200 is shown to include a display 208, a set of speakers 210*a*–210*b*, a camera 212, and other equipment such as a mouse (not shown). Sending computer 200 may send a message to the receiving computer 202 in accordance to the specific embodiments of the present invention.

Figure 3A:
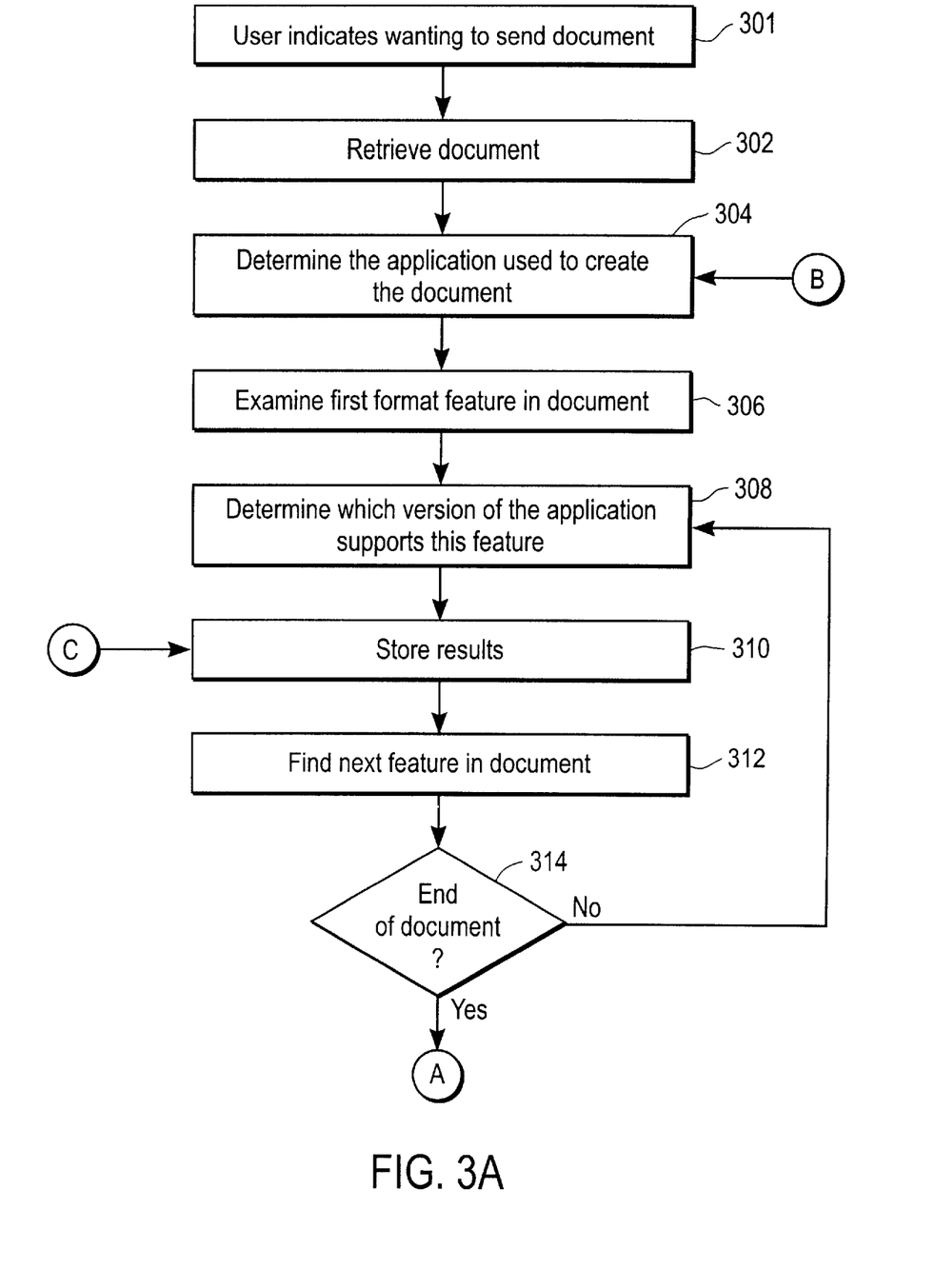
FIGS. 3A–3B are flow diagrams of a method for formatting a message, according to an embodiment of the present invention.
Figure 3B:
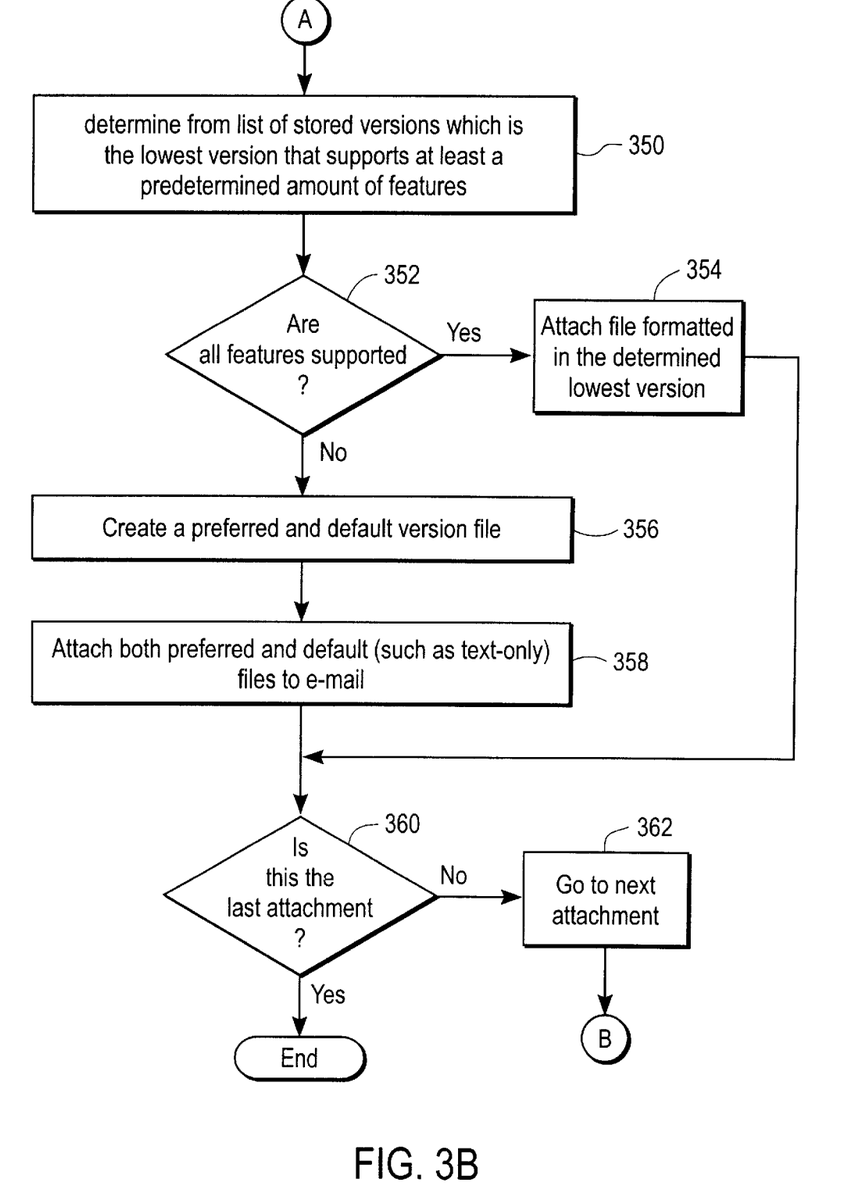

FIGS. 3A–3B are flow diagrams of a method according to an embodiment of the present invention for formatting a message. A user at a sending computer indicates that a file, such as a data document, is to be sent (step 300). Examples of the file include a data file, a voice file, a video file, a fax, and an image file. A further example of the file includes a multimedia message file that includes some combination of voice, data, video, fax, and image. The desired file, such as a text document, is retrieved (step 302). The system of the present invention determines the application that was used to create the file (step 304). For example, if the file is a text document, an application such as WordPerfect or Microsoft Word may have been used to create the file. Examples of how the application determination may be made include: evaluating the file name since file names often indicate the application that was used to create the file; or evaluating the beginning of the file since the beginning of files created by the same application often include the same beginning. Other ways to determine the application may be used in other embodiments.

A first format feature found in the document is then examined (step 306). Examples of format features include bold, italics, underline, footnotes, line numbering, auto indent, and redlining. These format features can be identified by searching for a marker that indicates that a format feature is being used. For example, a feature code or marker in some applications is typically found prior to the beginning of an underline feature. It is then determined which version of the application supports this feature (step 308). For example, a particular feature, such as redlining, may be supported in the latest version of a word processing application, but not in the previous versions of the word processing application. Once a version (or versions) of the application supporting this feature is determined, then the results are stored (step 310). Further details of the determination of the version of the application supporting a feature are later discussed in conjunction with FIG. 4.

A next feature in the document is then found (step 312). It is then determined whether it is the end of the document (step 314). The end of the document may be identified by reaching an end-of-document marker. Another way of identifying when the end of the document has been reached may be to determine the size of the document and to compare the document size to how much of the document has been evaluated at that time. If the end of the document has not been reached, then a version of the application supporting this feature found in step 312 is determined (return to step 308) and the results are then stored (step 310). Each version of an application typically includes a listing of features that are supported by the application. The list of supported features for each version of the applications to be evaluated is preferably collected and stored, by a network administrator for example, to create a master list of supported features for all the versions of all the applications in order to facilitate ease of determination of which application version supports a particular feature. This master list may be stored in a disk or main memory so that it can be accessed to make such comparisons. In some specific embodiments, this master list may be stored in a centralized database that may reside in a server in the network.

If, however, the end of the document has been reached (as determined in step 314), then, as shown in FIG. 3B, it is determined (step 350) which of the versions stored in step 310 is the lowest version that supports at least a predetermined amount of features that were found (in step 306 and 312). For example, the lowest version that still supports the predetermined amount, for example at least 90%, of the features used in the document may be selected. As a preferred example, the predetermined amount can be set to 100% of the features used, thus preserving the entire formatting.

It is then determined whether all features of the document are supported (step 352) by the lowest version determined in step 350. If all features are supported, then the file is formatted in the determined lowest version of the application and attached to the message (step 354). This version formatted in the lowest version of the application is herein referred to as the preferred version. Optionally, even if all features of the document are supported by the determined lowest version, a default version of the document, such as a text-only version, may be created and also attached to the message (this option allows redundancy for at least the information in the default portion of the document). It is then determined whether the document is the last attachment to the message (step 360). If the document is the last attachment to the message, then the process is complete. If, however, this is not the last attachment to the message, then the next attachment is evaluated (step 362). Thereafter, the application used to create this next attachment is then determined for further evaluation (return to step 304 of FIG. 3A).

If not all features are supported by the lowest version that supports at least a predetermined amount of features (step 352), then a preferred version, such as a version formatted in the lowest version, and a default version, such as a text-only version, of the document are created (step 356). The creation of a text-only version of a document is well known in the art. Typically, the format of the text is removed and the text remains simply separated by tabs or commas. Accordingly, this default version ensures that all of the text is preserved, if not the format, in case there is any damage to the original file. The default version may be customer-configured. For example, the default version may be an early version of a word processing application, a text-only version, or a wave file. A dual level default may also be set so that one default is set for internal messages and another default is set for external messages. For example, in an audio message, Shockwave may be used as a default file for internal messages within a company's network, while a wave file may be used as the default for external messages. The advantage for creating and sending a default file in addition to the preferred file is that the receiver should be able to open the message even if he does not have the same application that initially created the message.

Both the preferred version file and the default version file are attached to the message, such as an email (step 358). The preferred file is formatted in the lowest version found to support at least a predetermined amount of features (as determined in step 350), while the default file may be a text only file or in a predetermined format (created in step 356). Optionally, the system may be pre-configured so that only one of the files, either the preferred file or the default file, is sent. From step 358, it is then determined whether this attachment to the message is the last attachment (step 360). If this document is not the last attachment, then the next attachment is evaluated (step 362) and the particular application used to create the next attachment is determined (return to step 304 of FIG. 3A). If the system determines in step 360 that this document is the last attachment, then the process is completed.

Figure 4:
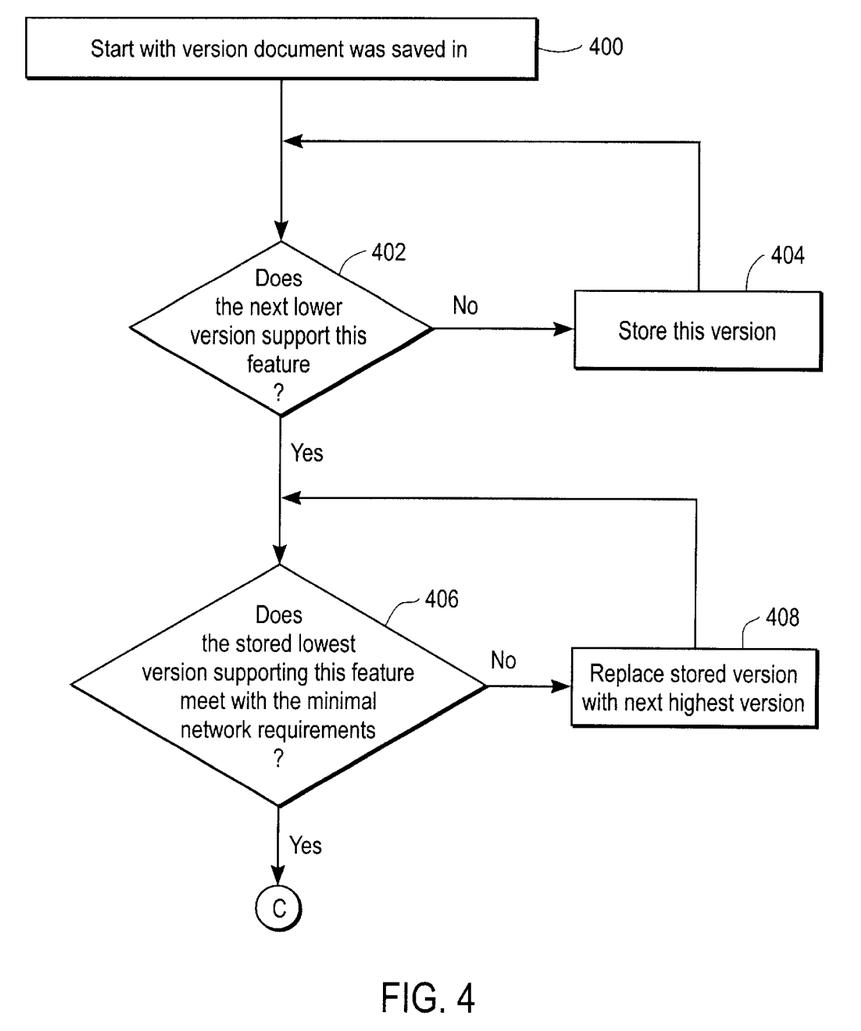
FIG. 4 is a flow diagram of a method for determining which version of the application supports a particular feature, according to an embodiment of the present invention.

According to another embodiment of the present invention, FIG. 4 is a flow diagram of a more specific method for determining which version of an application supports a given feature, such as the determination made in step 308 of FIG. 3A. Initially, the system starts with the version (in this example, we will assume version 5.0) of the application that the original document was saved in (step 400). It is then determined whether the next lower application version (in the example, version 4.0) supports this feature (step 402). If this version (version 4.0) supports this feature, then this version (version 4.0) is stored in step 404, and the system continues to loop through steps 402 and 404 to determine whether the next lower version also supports this feature (return to step 402) until the lowest version supporting this feature is saved (in this example, we will assume that the system has stored version 3.0). Then, when the system in step 402 finally determines that next lower version does not support this feature, the system checks in step 406 whether the stored lowest version (version 3.0) supporting the feature meets the minimal network requirements. This determination in step 406 ensures that the stored version meets the minimal network requirements. For example, a company may have instituted a requirement for its network that no one on the network will use a word processing version lower than, for example, version 4.0. Since the system determines in step 406 that the stored lowest version (version 3.0) does not meet the minimal network requirements, the system replaces the stored version (version 3.0) with the next highest version (version 4.0) in step 408. Then the system returns to step 406 to check whether the stored lowest version (now, version 4.0) meets the minimal network requirements (version 4.0). Since the stored lowest version supporting the feature does meet the minimal network requirements, the system stores the results in step 310 of FIG. 3A. Therefore, in this specific embodiment the system ensures that the minimal network requirements are met in determining the lowest application version supporting a given feature.

Figure 5:
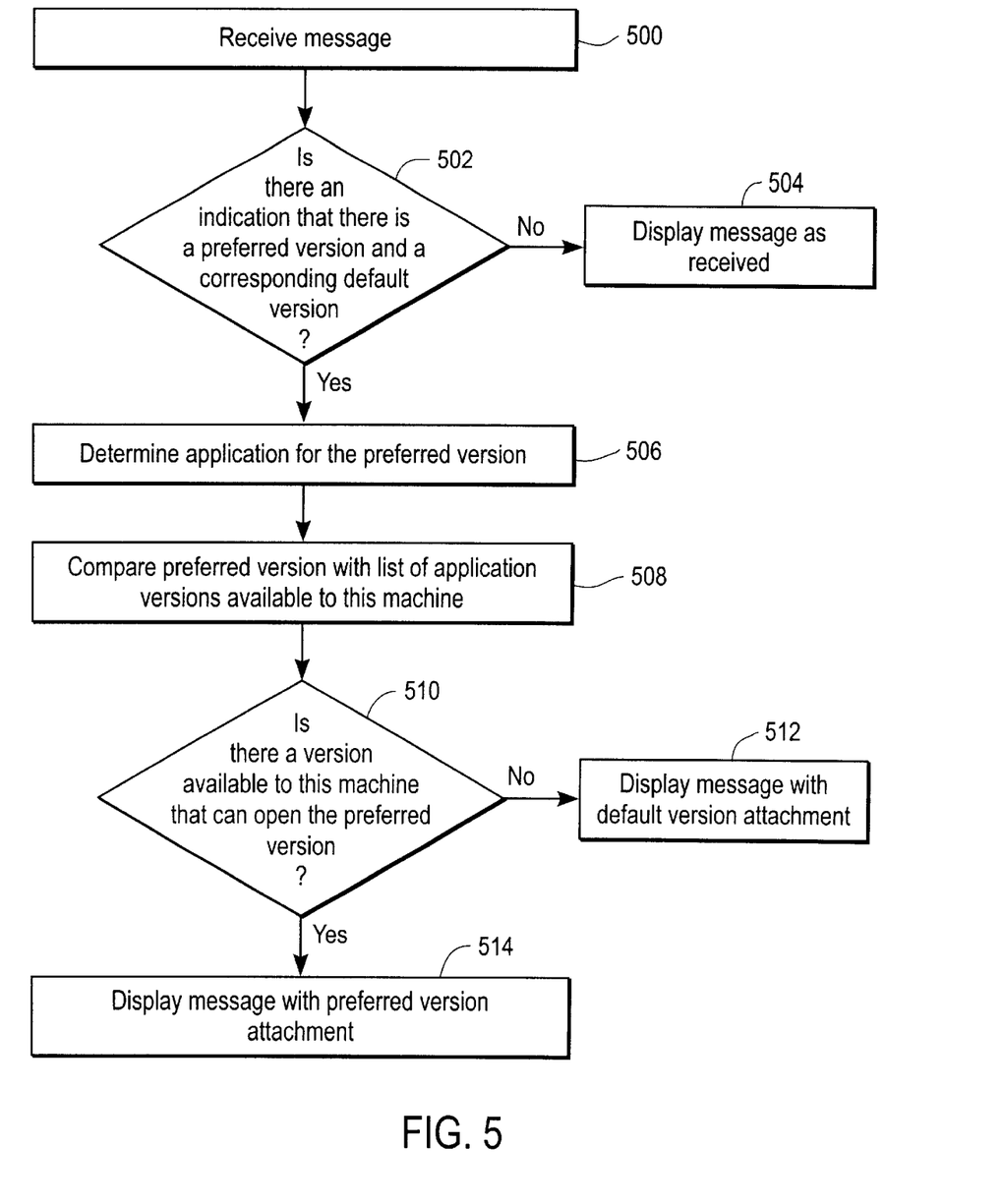
FIG. 5 is a flow diagram of a method for processing a message, according to an embodiment of the present invention.

FIG. 5 is a flow diagram of a method for processing a received message, according to an embodiment of the present invention. A message, such as the message described in FIGS. 3A–3B, is received by a receiving device (step 500). It is then determined whether there is an indication that there is a preferred version and a corresponding default version attached to the message (step 502). For example, a character string, such as [*] may be used in the title of the attachments to indicate to both the receiver and the receiving device that the attachments correspond to each other. The receiving device could perform a search for such a character string to determine whether attachments are different versions of the same information.

If there are no attachments with a preferred version and a corresponding default version, then the message, as received, is displayed to the receiver (step 504). If, however, there are attachments with a preferred version and a corresponding default version, then the application used for the preferred version is determined (step 506). One way to identify the preferred version may be to assume that the first attachment is the preferred version and the second attachment is the default version. Another way to identify the preferred version may be to use an identifying character, such as [p]. The preferred version is compared with a list of application versions available to the receiver's device (step 508). For example, if the preferred version is a Word 6 document, then it is determined whether the receiver's device has access to Word 6. The list of available applications are preferably prepared in advance so that an easy comparison may be made.

It is then determined whether the receiver's device has access to an application version that can open the preferred version (step 510). If the receivers device cannot open the preferred version, then the received message is displayed with the default version attachment (step 512). If, however, the receiver's device can open the preferred version, then the received message is displayed with the preferred version attachment (step 514).

Optionally, the received message may be displayed with both the preferred version and the default version, in case the receiver does not have the software to automatically select a version. Each version could be identified in a manner so that the receiver would understand the application that was used for each version. For example, one version may be named "presentation.doc", to indicate a Microsoft Word file, and the other version may be named "presentation.text", to indicate a text-only file. The receiver may then select a version to open.

Another alternative is to display automatic phrases that notify the receiver that there are two versions of the same attachment. For example, the message may identify one version as a Word version 5, and another version as a text file. The receiver may then select a version to open.

Methods and a system for sending an electronic message in a compatible messaging format, and processing such received messages, have been disclosed. Software written according to the present invention may be stored in some form of computer-readable medium, such as memory or CD-ROM, or transmitted over a network, and executed by a processor. Although the present invention has been described in accordance with the specific embodiments above, one of ordinary skill in the art will readily recognize that there could be variations to the embodiments and these variations would be within the spirit and scope of the present invention. Accordingly, many modifications may be made by one of ordinary skill in the art without departing from the spirit and scope of the appended claims.

What is claimed is:

1. A method for sending an electronic message, said method comprising steps of:

determining an application used to create at least a portion of a first electronic message;

determining a version of said application that supports a feature associated with said first electronic message;

creating a second electronic message, wherein said second electronic message is formatted in the determined version of said application; and creating a third electronic message, wherein said third electronic message is a predetermined version of said portion of said first electronic message.

2. The method of claim 1 further comprising examining said feature of the portion of the first electronic message.

3. The method of claim 1, wherein said portion of said first electronic message is an attachment of said first electronic message.

4. The method of claim 1, wherein the version of the application is an earlier version of said application used to create said portion of said first electronic message.

5. The method of claim 1, wherein said third electronic message is a text-only version of said portion of said first electronic message.

6. The method of claim 1, wherein said first electronic message is an e-mail.

7. The method of claim 1, wherein said first electronic message is a voice mail.

8. The method of claim 1, wherein said first electronic message is a multimedia message.

9. The method of claim 1, wherein said determined version supports at least a predetermined amount of features.

10. The method of claim 1, wherein said determined version meets a predetermined criteria.

11. The method of claim 10, wherein said predetermined criteria is a network requirement.

12. The method of claim 10, wherein said determined version is an earliest version of a plurality of versions that meet said predetermined criteria.

13. A system for sending an electronic message, comprising:

means for determining an application used to create at least a portion of a first electronic message;

means for determining a version of said application that supports a feature associated with said first electronic message;

means for creating a second electronic message, wherein said second electronic message is formatted in the determined version of said application; and means for creating a third electronic message, wherein said third electronic message is a predetermined version of said portion of said first electronic message.

14. The system of claim 13, wherein said determined version meets a predetermined criteria.

15. A system for sending an electronic message, comprising:

a processor configured to determine an application used to create at least a portion of a first electronic message, said processor also determining a version of said application that supports a feature associated with said first electronic message, said processor also creating a second electronic message, wherein said second electronic message is formatted in the determined version of said application, and said processor also creating a third electronic message, wherein said third electronic message is a predetermined version of said portion of said first electronic message; and a memory coupled to said processor, said memory configured to provide said processor with instructions.

16. The system of claim 15, wherein the version of said application is an earlier version of said application used to create at least portion of said first electronic message.

17. The system of claim 15, wherein said third electronic message is a text-only version of said portion of said first electronic message.

18. The system of claim 15, wherein said determined version supports at least a predetermined amount of features.

19. A computer program product for sending an electronic message, comprising:

computer code determining an application used to create at least a portion of a first electronic message;

computer code determining a version of said application that supports a feature associated with said first electronic message;

computer code creating a second electronic message, wherein said second electronic message is formatted in the determined version of said application;

computer code creating a third electronic message, wherein said third electronic message is a predetermined version of said portion of said first electronic message; and computer-readable media that stores said computer codes.

20. The computer program product of claim 19, wherein the computer-readable media is selected from the group consisting of CD-ROM, floppy disk, tape, flash memory, system memory, hard drive, and data signal embodied in a carrier wave.

21. A method for receiving an electronic message, the method comprising:

receiving an electronic message;

determining whether a first version of an application may be used to open a second version of said application, wherein said second version of said application is associated with an attachment of said electronic message; and displaying said electronic message with a default version if said first version of said application may not be used to open said second version of said application.

22. The method of claim 21, further comprising displaying said electronic message with said second version if said first version of said application may be used to open said second version of said application.

23. The system of claim 13, wherein said determined version is a most rudimentary version of a plurality of versions that that meet said predetermined criteria.

24. The system of claim 13, wherein said means for determining said version comprises:

means for maintaining a list of versions of said application, said list of versions indicative of features supported by said versions;

means for examining said list of versions for support for multiple features associated with said first electronic message, including said feature.

25. The system of claim 15, wherein said processor, in said determining said version, determines an earliest version of said application that supports said feature and that is no older than a predetermined earliest allowable version.

26. In an information processing system, a method for electronic communication, said method comprising:

receiving an indication that a first electronic document is desired to be sent;

wherein said first electronic document is associated with a first format, and a plurality of versions are available for said first format;

determining a version of said first format, of said plurality of versions, that supports at least one feature associated with said first electronic document, without requiring that the determined version be a version already associated with said first electronic document;

creating a second electronic document according to said determined version of said first format; and sending said second electronic document.

27. The method according to claim 26, wherein said determining step comprises determining as said determined version a most rudimentary version of said first format that supports said at least one feature.

28. The method according to claim 26, wherein said plurality of versions includes only versions no lower than a predetermined minimum version requirement, and any version lower than said predetermined minimum version requirement is not available.

29. The method according to claim 26, further comprising creating a third electronic document according to a predetermined format, wherein said sending step comprises sending said third electronic document.

30. The method according to claim 29, wherein the sending step comprises sending an electronic mail message that includes said second and third electronic documents as attachments.

31. The method according to claim 30, wherein said electronic mail message includes indication that said second electronic document is preferred over said third electronic document.

32. The method according to claim 26, wherein said version determining step comprises determining as said determined version a version that supports at least a predetermined amount of all features associated with said first electronic document.

33. The method according to claim 32, wherein said predetermined amount includes less than all features associated with said first electronic document.

34. The method according to claim 26, wherein said version determining step comprises:

maintaining a list of versions of said first format, said list of versions indicative of features supported by individual versions of said list of versions; and examining said list of versions for said at least one feature to determine said determined version.

35. The method according to claim 34, wherein said first format is associated with a software application for editing and saving said first electronic document, and said versions of said list of versions are each associated with versions of said software application.

36. The method according to claim 34, wherein said list of versions is maintained on a centralized database that resides in a server on a network.

37. The method according to claim 26, wherein said at least one feature includes a plurality of text-formatting features.

38. The method according to claim 26, further comprising, prior to said determining step, receiving said first electronic document.

39. The method according to claim 26, wherein said first format is a file format associated with a software application for editing said first electronic document, and said determined version of said first format is associated with a version of said software application.

40. In an information processing environment, a method for receiving electronic communication sent according to claim 26, the method for receiving comprising:

receiving an electronic message;

determining that the received electronic message includes an information represented using a first formatting and a second formatting;

determining whether an available version of an application may be used to open said information represented using said first formatting; and if not, opening said information represented using second formatting.

41. The method according to claim 40, wherein said determining step includes automatically determining, based on an indication within said electronic message, that said information represented using said first formatting is preferred over said information represented using said formatting.

* * * * *